Patented July 17, 1951

2,561,041

UNITED STATES PATENT OFFICE 2,561,041

VARIABLE REACTANCE AND CONTROL DEVICE COMPRISING SUCH A REACTANCE

Jacobus Ludovicus Arends and Eduard Herman Hugenholtz, Eindhoven, Netherlands, assignors to Hartford National Bank and Trust Company, Hartford, Conn., as trustee Application October 22, 1948, Serial No. 55,912
In the Netherlands December 13, 1947

11 Claims. (Cl. 175—41.5)

This invention relates to a variable reactance comprising a control member which is actuated by a control current and to control devices comprising such a variable reactance controlled by the control current. The invention may advantageously be used particularly in arrangements for automatic frequency correction (AFC).

For automatic frequency correction it is known to use an amplifying tube which may, for instance, be connected in parallel with the frequency-determining circuit of an oscillator and acts as a variable reactance. This permits extremely rapid AFC-control with a low control-power, high electrical sensitivity and low sensitivity to mechanical vibrations. However, the control range is small and such an AFC-arrangement exhibits a so-called set back force i. e. that upon failure of the control voltage supplied to the reactance tube, the value of the apparent reactance formed by the tube is reduced to a given average value.

In other known AFC-arrangements these disadvantages are avoided. In these arrangements a motor starts in one or the other direction of rotation in accordance with the sign of the required frequency correction and thus actuates a control member, for instance in an intermediate electrode of a capacity to be controlled, in a direction corresponding to the direction of rotation of the motor. In this type of arrangements the motor is disengaged as soon as the required frequency correction has been effected, and in the absence of a control voltage or control current for some reason, the position of the control member does not alter, in other words there is no so-called set-back force.

AFC-arrangements of the last-mentioned type permit a comparatively great control range but, owing to the naturally involved mechanical inertia, rapid frequency-variations cannot be followed and the system is sensitive to mechanical vibrations. Moreover, the motor as compared with a reactance tube, requires a very high control-power. In general, satisfactory electrical sensitivity is obtainable only with the use of powerful amplifiers.

AFC-arrangements comprising reactance tubes and motor-controlled reactances are often used simultaneously in connection with the complementary properties with respect to control speed, control sensitivity, control range, set-back force and sensitivity to mechanical vibrations.

The invention concerns inter alia a control device comprising a reactance which is variable by a movable control member and closely related with control devices comprising a motor-controlled reactance, but which permits a satisfactory compromise, particularly for AFC-purposes to be arrived at between the properties stated in the previous paragraph.

According to the invention the control member consists of a magnetically actuated piston in a liquid-filled tube, and the parts of the variable reactance, which cooperate electrically with the control member, are structurally integral with the tube.

The arrangement according to the invention has a minimum of moving parts and does not comprise fast moving parts, whilst the force required for actuating the piston, and consequently the required control power, is comparatively low. Moreover, any troublesome mechanical initial friction can be avoided and there is no set-back force.

If the piston fits closely in the tube it can move only very slowly, since all of the liquid displaced must pass between the piston and the wall of the tube. The damping of motion thus introduced is variable within wide limits inter alia by the choice of the viscosity of the liquid. If desired, it may be increased by providing transverse grooves in the wall of the piston, by which grooves turbulence is brought about in the liquid. A judicious choice of the damping of motion is obtainable by correct aperiodic control (critical damping) at a comparatively high rate of control. Of course, in choosing the liquid used, the extreme ambient temperatures and the consequent variations of viscosity and internal friction should be taken into account.

If the average specific gravity of the piston corresponds to the specific gravity of the surrounding liquid the "floating" control member, in the event of mechanical vibrations of the tube, does not move with respect to the latter, so that if the parts of the variable reactance electrically co-operating with the control member, are structurally integral with the tube, external mechanical vibrations are practically unable to affect the value of the reactance. In the case of a "floating" piston there is no mechanical initial friction at all.

The movement of the control member may be utilised for varying the inductance of control coil wound on the tube, by causing the piston to influence the reluctance of the field of the coil (field displacement or field concentration by non-magnetic and magnetic material respectively). In this event, however, the control coil must sometimes be magnetically decoupled with respect to the exciter coil(s) actuating the control member, in order that in the event of control-current variations disturbing currents induced by them in the control coil may be avoided.

This difficulty is avoided with the use of a capacitative reactance to be controlled, when the piston, which may consist of metal, may be used as a capacitative intermediate electrode.

In order that the invention may be clearly understood and readily carried into effect it will now be explained more fully by reference to the accompanying drawings given by way of example.

Figure 1:
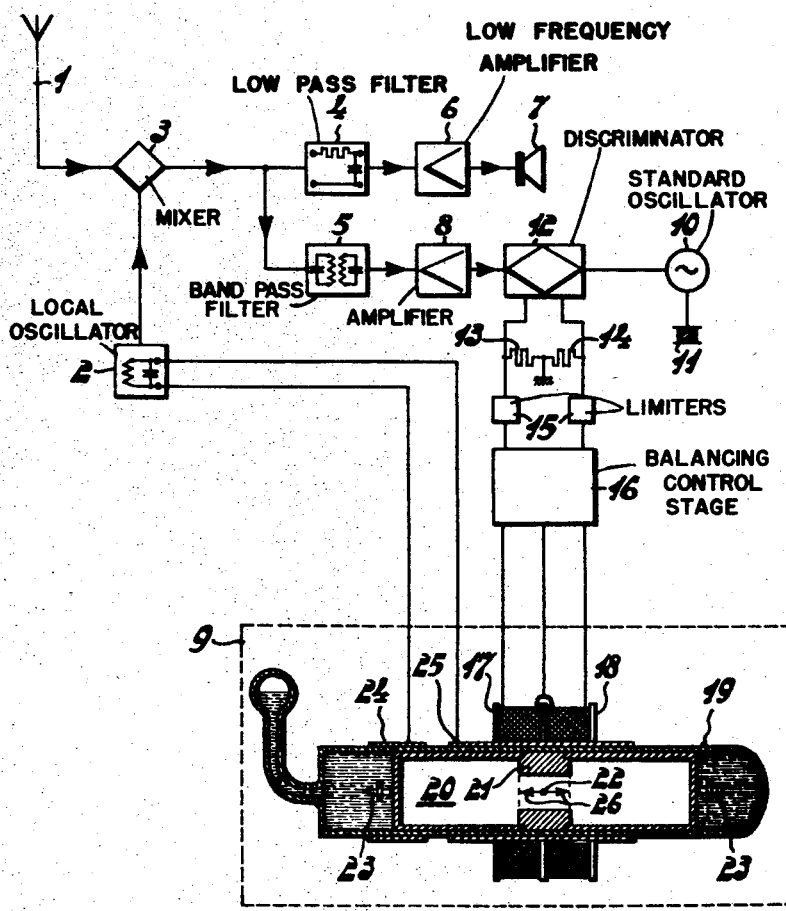
Fig. 1 shows a single side-band receiver of a type known per se, and a suitable form of an AFC-arrangement according to the invention.

The embodiment of the invention shown in Fig. 1 comprises an antenna 1 for receiving a single side-band signal with suppressed carrier-wave, which signal is supposed to comprise the intelligence signals and in addition a 10 kc. pilot frequency represented by an incoming frequency of 500 kc. The carrier-wave signal required to be added for detection of the incoming signals should have a frequency of 490 kc. and is derived from an automatically frequency-corrected local oscillator 2. The incoming signals and the local oscillator signal are mixed in a mixer stage 3 for detection. The detected signals appearing in the output circuit are divided in regard to frequency, by means of a low-pass filter 4 and a band-pass filter 5, into intelligence signals and a pilot frequency which are supplied to a low-frequency amplifier 6 connected to a reproducing device 7 and an amplifier 8 respectively.

The frequency of the carrier-wave signal produced by the local oscillator 2 is required to be automatically frequency-controlled by means of a reactance 9 which is connected in parallel with the frequency-determining oscillatory circuit in such manner that the pilot frequency corresponds exactly to the frequency of a comparison signal derived from a standard oscillator 10 comprising a 10 kc. control crystal 11.

To obtain the required control voltage the pilot signal and the comparison signal are fed to a discriminator 12 known per se which supplies a direct voltage, of which the polarity and value, in the event of frequency differences and phase differences respectively, correspond to the polarity and value of the frequency difference and phase-difference respectively of the signals compared. The positive and negative control direct voltage is set up at the discriminator output-resistances 13 and 14 respectively and are fed, as the case may be through limiters 15, to a balancing control stage 16, of which the output direct current, in accordance with the polarity of the control voltage, excites one or the other of two exciter coils 17, 18 of the variable reactance 9.

The variable reactance 9 comprises a hollow metal e. g. . . . copper or aluminium piston 20 which is movable in an axial direction in a liquid-filled glass tube 19, and comprises a central annular soft iron core 21. For balancing the piston 20 mechanically with respect to the centre 22, which is of importance for insensitivity of the control member to mechanical vibrations, balancing nuts 23 are provided at both ends of the piston. The piston is constructed in such manner that its specific gravity (i. e. the quotient of piston weight and piston volume) corresponds to the specific gravity of the liquid.

In Fig. 1 the piston is depicted in its central position and moves to the left or to the right according as to whether one or the other coil 17, 18 is excited.

The piston constitutes a capacitive intermediate electrode and cooperates electrically with two cylindrical electrodes 24, 25 which are cemented in an axial direction side by side to the outer wall of the tube 19 and are connected, as is shown diagrammatically, to the ends of the frequency-determining oscillatory circuit of the local oscillator 2.

The electrode 25 extends within the exciter coils 17, 18 and beyond them over a considerable length of the piston. However, the capacity between the electrode 25 and the piston 20 does practically not vary upon displacement of the piston as indicated by arrows 26, since the piston ends constantly project sufficiently from the electrode 25.

Contrary thereto, the capacity between the electrode 24 and the piston 20 varies considerably upon displacement of the piston, since this electrode surrounds the left-hand end of the piston so that the active surface varies considerably upon displacement of the piston.

In an experimental construction of the device shown in Fig. 1, in which the variable capacity 9 corresponded, as regards construction and size, to that shown in this figure, the following data were measured:

Speed of displacement with 160 ampere-turns excitation: 0.5 mm./sec.

Maximum piston stroke: 10 mm.

Total detuning possibility: 40 kc. with 500 kc.

Speed of readjustment 2 kc./sec. with aperiodic control.

Minimum energization for readjustment: 10 ampere-turns.

Sensitivity: the piston moment stops and reverses by a number of ampere-turns caused by a detuning of a few kc./sec.

Mechanical sensitivity: vigorous tapping in an axial or transverse direction on the tube 19 does not cause any detuning. Only with synchronism between pilot signal and comparison signal a phase variation, discernible by means of an oscillographically projected Lissajous-figure, occurs between the compared signals.

In the construction shown in Fig. 1, the glass tube 19 constitutes the dielectric of the controlled capacity, and the capacity variation amounted to approximately 15 micro-microfarads at the most. The use of insulating material having a higher dielectric constant permits the capacity variation to be considerably increased.

Instead of the tube 19 the piston wall may, of course, act as a dielectric. In this event the intermediate electrode is provided on the inner wall of the piston and the electrodes 24, 25 form parts of the wall of the tube 19.

If the piston body has a permanent magnetic core, it is sufficient to use a single exciter coil instead of the coils 17 and 18.

Figure 2:
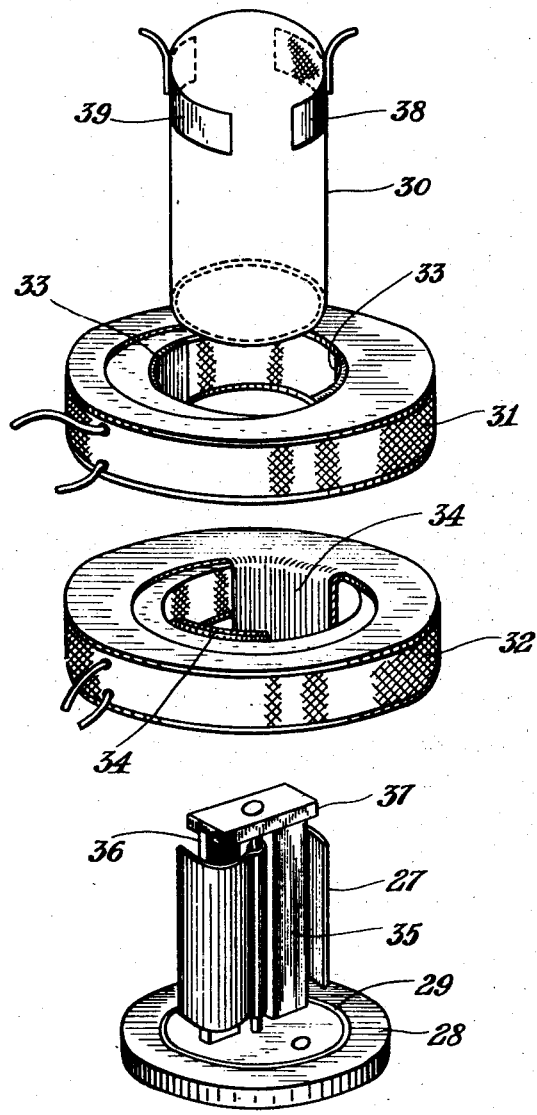
Fig. 2 is a perspective view of the component parts of a variable condenser according to the invention.

Fig. 2 shows a simple form a variable condenser according to the invention, in which the piston is constituted by a rotatable winged member.

This device exhibits inter alia the advantage that, unless torsional vibrations come into play, the ratio between the average specific gravity of the winged member and the liquid may vary within wide limits without any troublesome effects, which is of great importance, for example with the use in airplanes. Satisfactory damping of motion of the winged member can easily be obtained.

The variable condenser shown in Fig. 2 comprises a control member consisting of a rotatable winged member 27 which is placed in a liquid-filled glass tube 30 cemented in a circular groove 29 of a base 28, and which is actuated by two exciter coils 31, 32 surrounding the tube 30. The winged member 27 consists of a soft iron strip curved into an S in such manner that its ends extend in a cylindrical plane around the axis of rotation of the winged member. The winged member 27 is rotated under the influence of the exciter coils 31, 32 constituting a rotary-field exciter system. To this end, the said coils surround the wall of the tube in such manner that their pole shoes 33 and 34 are relatively displaced by 90° in space. The rotation of the winged member is limited in both directions by two bars 35 and 36 which are secured, at both sides of the shaft of the winged member, to the base 28 and carry another bearing plate 37 for the shaft of the winged member.

Apart from the means, referred to in connection with the construction of the variable reactance shown in Fig. 1, for varying the damping of motion of the control member, for instance a definite choice of the viscosity of the liquid, the damping of the winged member in the aforesaid construction is also determined by the width of the bars 35 and 36.

The winged member 27 constitutes a capacitative intermediate electrode and co-operates electrically with two coatings 38 and 39 cemented side by side on the outer wall of the tube 30 and partly surrounding the outer wall of the tube. These coatings may, for example, be connected to the ends of a frequency-determining circuit of an automatically frequency-corrected oscillator.

The rotation of the soft iron winged member caused by the action of the exciter coils 31 and 32 may also be utilised for varying the inductance of a control coil which is constructed similarly to the exciter coils 31, 32 and surrounds the wall of the tube.

If a high-frequency control coil is used, the yoke should consist of high-frequency magnetic material and rotation of the soft iron winged member will bring about a displacement of field and consequently a decrease in inductance of the control coil.

It is also possible to obtain an increase in inductance of the high-frequency control coil by securing to the winged member a core consisting of high-frequency magnetic material.

Figure 3:
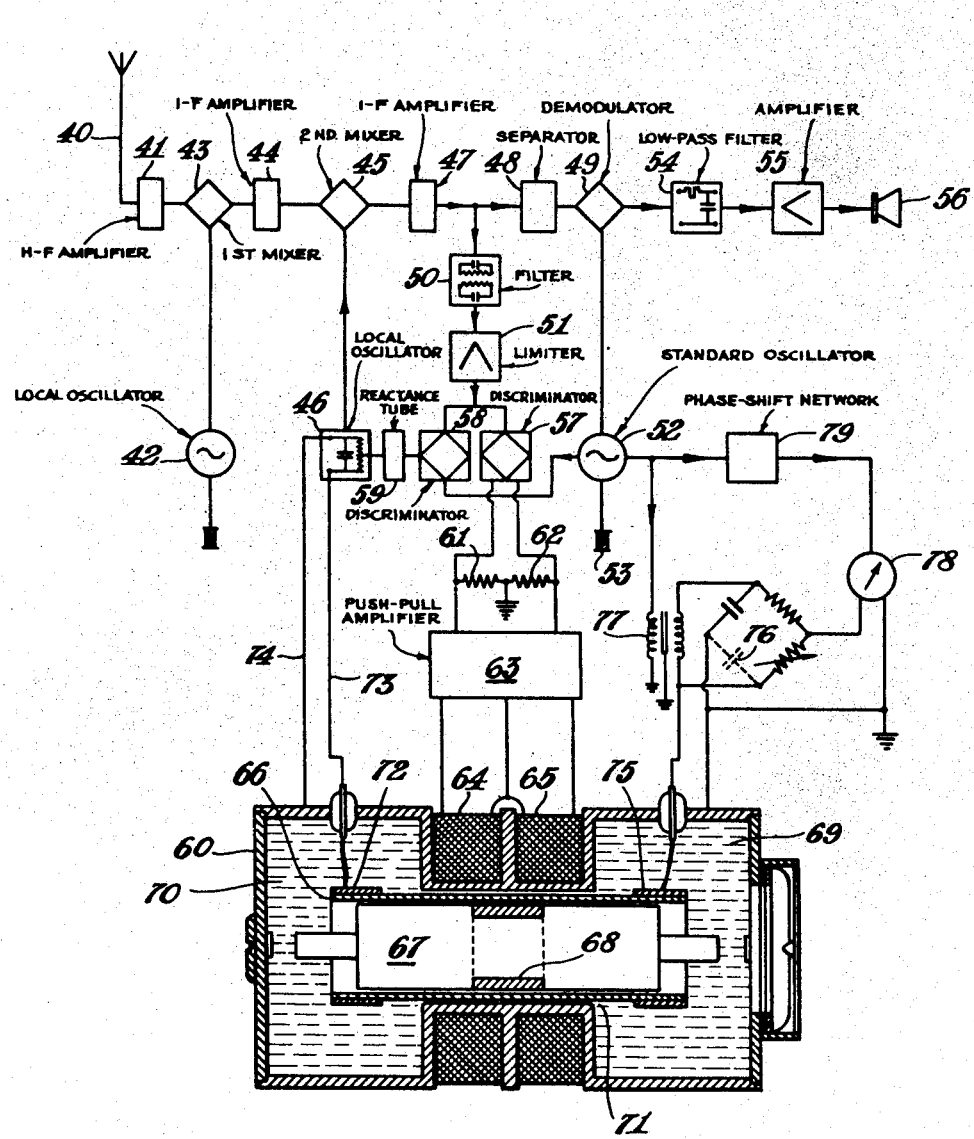
Fig. 3 shows a single side-band receiver and a particularly suitable form of an AFC-arrangement according to the invention.

Fig. 3 shows a single side band receiver of a type known per se with a particular suitable form of an AFC-device according to the invention.

After amplification in a high-frequency amplification stage 41, the single side band signal with suppressed carrier wave picked-up by an antenna 40, which signal is supposed to comprise the intelligence signals and in addition a 10 kc./sec. pilot frequency, is supplied to a first mixer stage 43 jointly with the oscillator signal from a first crystal-controlled local oscillator 42.

The intermediate frequency signal of, say, 500 kc./sec.–496 kc./sec. obtained upon mixing, in which the frequency of 500 kc./sec. represents the 10 kc./sec. pilot frequency, is mixed, after intermediate frequency amplification (44), in a second mixer stage 45, with the frequency of 490 kc./sec. produced by an automatically frequency-corrected local oscillator 46.

The single side-band signal appearing in the output circuit of the mixer stage 45, which signal extends over a frequency range of, say, 10–6 kc./sec. after having been transposed twice, is supplied, respectively, after further intermediate-frequency amplification (47), to a demodulator 49 through a separating stage 48 and to an amplifier 51, preferably comprising a limiter, through a band-pass filter 50 for separating the intelligence signals and the pilot frequency.

To the demodulator 49 is supplied a local oscillator signal from a standard oscillator 52 comprising a 10 kc./sec. control-crystal 53, and the low-frequency signals (0 to 4 kc./sec.) appearing in the output circuit of the mixer stage 49 are supplied, through a low-pass filter 54 and a low-frequency amplifier 55, to a reproducing device 56 connected thereto.

The frequency of the signal produced by the local oscillator 46 is required to be automatically frequency-controlled in such manner that the pilot-frequency exactly corresponds to the frequency of the comparison signal from the standard oscillator 52.

To this end the pilot signal from the amplifier 51 is supplied to a band-pass filter discriminator 57 tuned to 10 kc./sec. and a comparing discriminator 58 (for example a mixer stage or a rotary field discriminator) to which the comparison signal is also supplied. It is pointed out that a single discriminator may be sufficient.

The comparison discriminator 58 supplies a corresponding control voltage as regards polarity and value of the phase difference between pilot-signal and comparison-signal, and serves for controlling a reactance tube 59 for rapidly correcting comparatively small frequency deviations which tube is coupled with the frequency-determining oscillatory circuit of the oscillator 46.

The absolute discriminator 57 supplies a corresponding control voltage in regard to polarity and value of the frequency difference and serves for controlling a variable reactance 60 for (slow) correction of comparatively considerable frequency deviations, which reactance is likewise connected in parallel with the frequency-determining oscillatory circuit of the oscillator 46. Naturally, the discriminators 57, 58 should have relatively different ranges matched to the control ranges of the frequency-correctors 59, 60 to be controlled. The positive or negative control voltage of the discriminator 57 is set up at the output resistances 61 and 62 respectively and is supplied to a push-pull amplifier 63, of which the output direct current, in accordance with the polarity of the control voltage, energises one or the other of two exciter coils 64, 65 of a variable reactance 60.

The variable reactance 60 comprises a hollow metal piston 67 movable in an axial direction in a glass tube 66 which is open at both ends. This piston is preferably corrosion-resistant, for instance chromium plated, and contains a central annular soft iron core 68. The ends of the tube 66 empty centrally into chambers 69, 70 which are substantially entirely filled with a neutral liquid, for instance kerosene, and are interconnected by a metal tube 71 of which the diameter is smaller than that of the liquid-filled chambers. The resulting constriction in the metal vessel thus formed embraces the glass piston tube 66. The two exciter coils 64, 65 are provided in the constriction between the liquid-filled chambers. These coils preferably have an external diameter which is a little smaller than that of the liquid-filled chambers, which permits the coils easily to be enclosed in a tropic proof manner.

In addition to a structural shape suitable for manufacture the advantage is obtained that no troublesome influence is experienced from any air bubbles appearing in the liquid. Any air bubbles forming in the piston tube are removed, upon displacement of the piston, from the piston tube to the liquid-filled chambers and cannot regain access to the piston tube.

Starting from the central position of the piston 67 it will move to the left or to the right in accordance with one or the other of the coils 64 or 65 being excited. In order that the core 68 is surrounded by the two exciter coils even with maximum displacement of the piston from its central position, the core 68 has a width exceeding the stroke of the piston.

The piston constitutes a capacitative intermediate electrode and co-operates electrically with a cylindrical coating 72 cemented to one of the ends of the piston tube on the outer wall of the latter, and with the electrode formed by the wall of the tube 71. These fixed electrodes 71, 72 are respectively connected to the ends of the frequency-determining oscillatory circuit of the local oscillator 46, as shown diagrammatically by leads 73 and 74. Since the electrode constituted by the wall of the tube 71 extends over a considerable length of the piston, the capacity between the said electrode and the piston, upon displacement of the piston from its central position, does practically not vary, since the piston ends constantly project sufficiently from the tube.

However, the capacity between the coating 72 and the piston 67 varies considerably upon displacement of the piston, since this coating surrounds the left-hand end of the piston so that upon displacement of the latter the active surface varies considerable.

In a test construction of the device shown in Fig. 3, in which the variable capacity 60 corresponded in regard to construction and value, to that shown in this figure, the following values were measured:

Speed of displacement with 210 ampere-turns excitation: 1.7 mm./sec.
Maximum piston stroke 10 mms.
Total detuning possibility 25 kc./sec. for 1000 kc./s.
Speed of readjustment: 1 kc./s. with aperiodic control.
Minimum excitation for readjustment: 12 ampere-turns.
Sensitivity: the piston movement stops and reverses its direction by a number of ampere-turns caused by a detuning of a few cycles/sec.

If the piston body comprises a permanent magnetic core 29 the sensitivity increases considerably.

In the example illustrated in Fig. 3 the glass tube 66 constitutes the dielectric of the controlled capacity and the capacity variation maximally amounted to 10 micro-microfarads. With the use of insulating material having a higher dielectric constant the capacity variation may again be increased materially.

If the piston body comprises a permanent magnetic core, a single excitor coil, instead of coils 64, 65, is sufficient.

The movement of the piston caused by the exciter coils 64, 65 may also be utilised for varying the inductance of a control coil wound on the glass tube, by causing the piston to influence the magnetic reluctance of the field of the coil (field displacement and field concentration by non-magnetic and magnetic material respectively).

To permit constantly an indication of the piston position, a further coating 75 is provided, similarly to the coating 72, at the other end of the glass tube 66, and the capacity varying in accordance with the piston displacement, which capacity is formed between the coating 75 and the wall of the (earthed) vessel, is included in a Wheatstone bridge circuit, as shown diagrammatically by the condenser 76 indicated in dash lines.

To this bridge circuit a 10 kc./s. signal from the standard oscillator 52 is supplied, through a transformer 77, through the intermediary of a 90° phase-shifting network 79. While the piston 67 occupies its central position the bridge circuit is set in such manner that no voltage appears in the output circuit. In this event a phase difference between the voltages to be compared cannot occur and the pointer occupies its middle position. In accordance with the direction of movement of the piston, a voltage leading or lagging by 90° with respect to the comparison-signal will be supplied to the phase-indicator through the bridge circuit, and the deviation of the pointer with respect to its middle position will indicate the correct piston position.

Of course, it is also possible to use an optical device indicating the piston position.

Again it is possible to use a means, for example an electron ray tube, in the receiver, for indicating the piston position. If the comparison frequency and the pilot frequency are supplied to a tuning indicator constructed as an electron ray tube, the occurring beat-frequency is perceptible if the two frequencies are substantially equal.

In the foregoing the invention has been set out with reference to particular forms of an AFC-device in single-sideband receivers. However, the invention may also be used in other forms of the AFC-device and both in transmitters and in receivers.

Furthermore the invention may be used in other control devices wherein variable reactances are used as control members, for example automatically controlled phase-shifters, for automatic tuning Wheatstone bridge circuits and the like.

What we claim is:

1. A voltage-responsive variable reactance device comprising a liquid-filled tube, a movable electrode disposed within said tube and having a portion thereof of magnetic material, first and second fixed electrodes disposed at spaced positions on the outer surface of said tube, and voltage-responsive electromagnetic means surrounding said tube for controlling the position of said movable electrode within said tube with respect to said fixed electrodes, thereby to vary the capacitance between said fixed electrodes in accordance with an applied voltage.

2. A voltage-responsive variable reactance device comprising a liquid-filled tube of dielectric material, a movable electrode disposed within said tube and constituted by a metallic piston having a portion thereof of magnetic material, first and second fixed electrodes secured at spaced positions on the outer surface of said tube, and voltage-responsive electromagnetic means surrounding said tube for controlling the position of said piston within said tube in either direction with respect to said fixed electrodes, thereby to vary the capacitance between said fixed electrodes in accordance with an applied voltage.

3. A voltage-responsive variable reactance device comprising a liquid-filled glass tube, a metallic piston disposed within said tube, an annular magnetic member affixed to said piston, first and second fixed electrodes secured at spaced positions on the outer surface of said tube, and an electromagnetic coil surrounding said tube for controlling the axial position of said piston within said tube.

4. A voltage-responsive variable reactance device comprising a liquid-filled tube, a movable electrode disposed within said tube and constituted by a hollow metallic piston having a portion thereof formed of magnetic material, first and second electrodes secured at spaced positions on the outer surface of said tube, an electromagnetic coil surrounding said tube to control the position of said piston within said tube with respect to said fixed electrodes, said piston having an average specific gravity corresponding to that of the liquid contained in said tube.

5. A variable reactance device, as set forth in claim 4, further including an adjustable balancing member secured to one end of said piston.

6. A voltage-responsive variable reactance device comprising a liquid-filled cylindrical tube of dielectric material, a movable electrode disposed within said tube and constituted by a metallic piston having a portion thereof formed of magnetic material, said piston being axially movable within said tube, first and second annular electrodes disposed at longitudinally spaced positions to the outer surface of said tube, and an electromagnetic coil surrounding one of said annular electrodes for controlling the position of said piston within said tube.

7. A voltage-responsive variable reactance device comprising a liquid-filled tube, a movable electrode disposed within said tube and constituted by a rotatable winged member of magnetic material, first and second fixed electrodes disposed at circumferentially spaced positions on the outer surface of said tube, and voltage-responsive electromagnetic means surrounding said tube for producing a rotating field rotating said member with respect to said fixed electrodes in accordance with an applied voltage, thereby to vary the capacitance between said fixed electrodes.

8. A variable reactance device, as set forth in claim 7, wherein said winged member is formed by a strip of magnetic material curved into the shape of an S such that its ends extend in an imaginary cylindrical surface concentric with the axis of rotation of the winged member.

9. A variable reactance device, as set forth in claim 8, wherein said electromagnetic means are constituted by a pair of exciter coils provided with pole shoes which are diametrically opposed with respect to the axis of the winged member.

10. A variable reactance device, as set forth in claim 9, further including a pair of damping bars positioned at either side of the axis of a winged member.

11. A variable reactance device comprising an open-ended cylindrical tube, a pair of liquid-filled chambers connected to either end of said tube, a metallic piston disposed within said tube and having a portion thereof formed of magnetic material, first and second electrodes secured at either end of said tube on the outer surface thereof, and an electromagnet surrounding said tube to vary the position of said piston and thereby the capacitance between said electrodes.

JACOBUS LUDOVICUS ARENDS.
EDUARD HERMAN HUGENHOLTZ.

REFERENCES CITED

The following references are of record in the file of this patent:

UNITED STATES PATENTS

| Number | Name | Date |
|---|---|---|
| 1,557,725 | Proctor | Oct. 20, 1925 |
| 1,641,438 | Jones | Sept. 6, 1927 |
| 1,875,329 | Chireix | Sept. 6, 1932 |
| 2,089,987 | Urfer | Aug. 17, 1937 |
| 2,332,044 | Bell | Oct. 19, 1943 |
| 2,456,463 | Starie | Dec. 14, 1948 |

FOREIGN PATENTS

| Number | Country | Date |
|---|---|---|
| 351,686 | Germany | Apr. 12, 1922 |